US005424901A

United States Patent [19]

Frederiksen et al.

[11] Patent Number: 5,424,901

[45] Date of Patent: Jun. 13, 1995

[54] SIDACTOR FAIL-SAFE DEVICE

[75] Inventors: Bjarne Frederiksen, Lombard; Mohammad Masghati, Addison, both of Ill.

[73] Assignee: Illinois Tool Works Inc., Glenview, Ill.

[21] Appl. No.: 188,509

[22] Filed: Jan. 26, 1994

[51] Int. Cl.$^{6}$ .................... H02H 9/04

[52] U.S. Cl. .................... 361/124; 361/119; 337/32

[58] Field of Search .................... 361/124, 127, 119; 337/32

[56] References Cited

U.S. PATENT DOCUMENTS

| | | | |
|---|---|---|---|
| 2,413,887 | 1/1947 | Pittman | 200/120 |
| 3,023,289 | 2/1962 | McAlister | 200/131 |
| 3,123,696 | 3/1964 | McAlister | 200/132 |
| 3,710,297 | 1/1973 | Kawazoe | 337/290 |
| 4,047,143 | 9/1977 | Burden et al. | 337/239 |
| 4,233,641 | 11/1980 | Baumbach | 361/119 |
| 4,371,911 | 2/1983 | Baker | 361/124 |
| 4,635,091 | 1/1987 | Roger | 357/67 |
| 4,717,902 | 1/1988 | James | 337/32 |
| 4,858,059 | 8/1989 | Okura | 361/124 |
| 4,910,489 | 3/1990 | Neuwirth et al. | 337/32 |
| 5,029,302 | 7/1991 | Masghati et al. | 337/32 |
| 5,089,929 | 2/1992 | Hilland | 361/111 |

FOREIGN PATENT DOCUMENTS

| | | | |
|---|---|---|---|
| 2167915 | 6/1986 | United Kingdom | H02H 3/22 |

*Primary Examiner*—Todd Deboer

*Attorney, Agent, or Firm*—Schwartz & Weinrieb

[57] ABSTRACT

An improved fail-safe mechanism is provided for use with a sidactor for protecting telecommunication equipment against high voltage surges. A sidactor includes first and second end terminal pins and a central terminal pin. The fail-safe mechanism consists of a torsional type spring and a pair of insulators. The torsional spring includes a single looped portion and a pair of spring arms extending radially outwardly from the opposite sides of the looped portion. The spring arms of the torsional spring are initially formed so as to have an obtuse angle therebetween. The center of the single looped portion is disposed off-centered in relationship to the centers of the first and second end terminal pins of the sidactor during assembly in order to assure that sufficient and constant pressure is applied between the spring arms and the end terminal pins.

22 Claims, 1 Drawing Sheet

SIDACTOR FAIL-SAFE DEVICE

BACKGROUND OF THE INVENTION

1. Field of the Invention

This invention relates generally to electrical overvoltage protective circuitry and more particularly, it relates to a sidactor protector for protecting telecommunication equipment against high voltage surges which includes an improved shunt protection arrangement for the sidactor protector.

2. Description of Prior Art

A state-of-the-art search directed to the subject matter of this application in the U.S. Patent and Trademark Office revealed British patent application No. 2,167,915 and the following U.S. Pat. Nos.:

| | |
|---|---|
| 2,413,887 | 4,635,091 |
| 3,023,289 | 4,717,902 |
| 3,123,696 | 4,858,059 |
| 3,710,297 | 4,910,489 |
| 4,047,143 | 5,029,302 |
| 4,233,641 | 5,089,929 |
| 4,371,911 | |

In U.S. Pat. No. 4,910,489 to H. Neuwirth et al. issued on Mar. 20, 1990, there is disclosed a fail-safe secondary fuse device 20 for assuring the grounding of a conductive gas tube used in modular protection devices for individual subscriber circuit pairs. The device comprises a length of spring music wire 21 having a central loop adapted to surround the central electrode 16 of the gas tube and rectilinear legs 23 and 24 terminating in ends 25 and 26. The end electrodes 14 and 15 of the gas tube are insulated from direct electrical communication with the respective ends 25 and 26 of the device by a fusible sleeve 27 made of insulative material. Upon the occurrence of a continued current overload, the heat emanating from the gas tube will serve to fuse the sleeve 27 thereby permitting the ends 25 and 26 to short the end electrodes 14 and 15 to the central electrode 16 which is grounded.

In U.S. Pat. No. 4,717,902 to K. S. James issued on Jan. 5, 1988, there is disclosed an excess voltage arrestor which is fitted with a protective temperature responsive device formed of a wire 1 of spring temper. The wire has a single loop 2 and is coated with a polyurethane varnish 3. The loop 2 is disposed over the central pin 4 of the voltage arrestor while the spring arms thereof are retained in a stressed condition by resting on the two outer pins 5 of the voltage arrestor. At an elevated temperature, the coating of the polyurethane varnish decomposes so as to allow the bared wire 1 to make electrical contact between the pins 4 and 5.

There is disclosed in U.S. Pat. No. 4,858,059 to M. Okura issued on Aug. 15, 1989, a short-circuit device of a gas-filled triple-pole discharge-tube type arrestor for telephone line use which includes a coil-like resilient short-circuit lead 7 being spot welded at its middle portion to an earth ground lead 5 and whose end portions thereof are disposed in a pushing contact made with the leads 3,3 in an entwined condition. The pushing contact portions of the leads 3,3 in contact with the lead 7 are coated with a low temperature meltable insulator 8,8.

There is disclosed in British patent application No. 2,167,915 to J. P. Phillips et al. published on Jun. 4, 1986, a circuit protection arrangement which includes a switch contact 4 in the form of a shaped resilient wire. The middle portion of the wire is tensioned so that it is biased towards the central earthed pin 2 of a gas discharged tube 1 but is constrained into contact with a pin 3 and post 7 by a fusible joint at point P1. When the temperature of the gas discharged tube 1 rises sufficiently so as to melt the fusible alloy at the point P1, the switch contact 4 is released from its constrained position so as to short the output terminals E1 or E2 to ground (FIG. 2*a*).

The remaining patents listed above but not specifically discussed are believed to be of only general interest and show the state of the art in overvoltage protection devices for protecting expensive equipment which incorporates various fail-safe mechanisms.

With the advent of electronic circuits for use in telecommunication equipment, there has arisen a need of providing new types of overvoltage protection means for the electronic circuits since they cannot tolerate the overvoltages which were permissible heretofore. As is generally known, the purpose of the overvoltage protection circuits is to protect the expensive telecommunication equipment connected to the output side of a terminal circuit against high voltage surges caused, for instance, by lightning strikes on the subscriber line.

A known conventional overprotection device in widespread use is the so-called three-element gas tube having a pair of spaced apart end electrodes and a central electrode. The end electrodes are typically connected to a pair of output lines coupled to the telephone equipment which is desired to be protected against excessive voltage, and the central electrode is connected to earth ground. Upon the occurrence of a voltage between the end electrodes or between either of the end electrodes and the central electrode above a predetermined potential, the gas tube becomes electrically conductive so as to shunt the overvoltage to ground thereby protecting the telecommunication equipment from the excessive voltage. However, in the event of a sustained over-voltage, over-current condition, that is, power crossing, the gas tube remains conductive and becomes overheated causing a fire hazard. Accordingly, it is important that the gas tube should fail in a safe manner so as to avoid leaving the telephone equipment unprotected.

Therefore, it has also been developed heretofore in the prior art various types of fail-safe arrangements for use in association with gas tubes and other kinds of overvoltage protection devices such as air-gap arrestors and the like. One form of fail-safe arrangement includes a temperature-responsive device comprising a resilient electrically conductive member which is normally maintained in a stressed condition by means of a heat softenable material. However, when the heat softenable material is used to normally hold the stressed resilient electrically conductive member out of engagement with a cooperative contact and is subsequently melted so as to permit a short-circuit engagement between the conductive member and the contact, there always exists the possibility that the stress applied to the conductive member will not be adequate enough in order to cause the conductive member to shunt the overvoltage to ground within a predetermined time interval.

Further, in a still later development the known three-element gas tubes have been generally replaced by solid-state voltage suppressors referred to as "sidactors" which are of a smaller dimension than the gas tubes.

The sidactors are formed with legs so that a plurality of them can be mounted in corresponding holes formed in a printed circuit board. As a result, the telephone connector blocks incorporating the printed circuit boards can be fabricated with an even higher circuit density. Therefore, it has been necessary to provide an improved fail-safe shunt protection arrangement for assuring that sufficient pressure is applied so as to ground the sidactor at elevated temperatures without significantly increasing the amount of space needed.

The present invention represents an improvement over the aforementioned '489, '902, and '059 U.S. Pat. Nos. and the '915 British patent application. The invention utilizes a torsional type spring whose spring arms are initially formed so as to have an obtuse angle therebetween. Further, during assembly, the center of the single loop portion of the torsional spring is disposed off-centered in relation to the centers of the end terminal pins of the sidactor in order to insure that sufficient and constant pressure is applied between the spring arms and the end terminal pins.

SUMMARY OF THE INVENTION

In a preferred embodiment, a sidactor fail-safe device used for protecting telecommunication equipment includes a sidactor and a fail-safe mechanism. The sidactor has a rectangularly-shaped body member, first and second end terminal pins, and a central terminal pin.

The fail-safe mechanism consists of a torsional type spring and a pair of insulators. The torsional spring includes a single looped portion and a pair of spring arms extending radially from the opposite sides of the looped portion. The looped portion is disposed in surrounding relationship with the central terminal pin of the sidactor. The pair of insulators are positioned on the ends of the pair of spring arms. The pair of spring arms are resiliently engagable with the first and second end terminal pins of the sidactor through the pair of insulators.

The spring arms of the torsional springs are initially formed so as to have an obtuse angle therebetween. The center of the single looped portion of the torsional spring is disposed off-centered in relation to the centers of the first and second end terminal pins of the sidactor during assembly in order to assure that sufficient and constant pressure is applied between the spring arms and the end terminal pins. Upon the occurrence of a sustained overload condition, the heat emanating from the sidactor will melt the insulators so as to short-circuit the first and second end terminal pins to the central terminal pin.

BRIEF DESCRIPTION OF THE DRAWINGS

The foregoing and other objects and advantages of the present invention will become more fully apparent from the following detailed description when read in conjunction with the accompanying drawings with like reference numerals indicating corresponding parts throughout, and wherein.

DESCRIPTION OF THE PREFERRED EMBODIMENT

Figure 1:
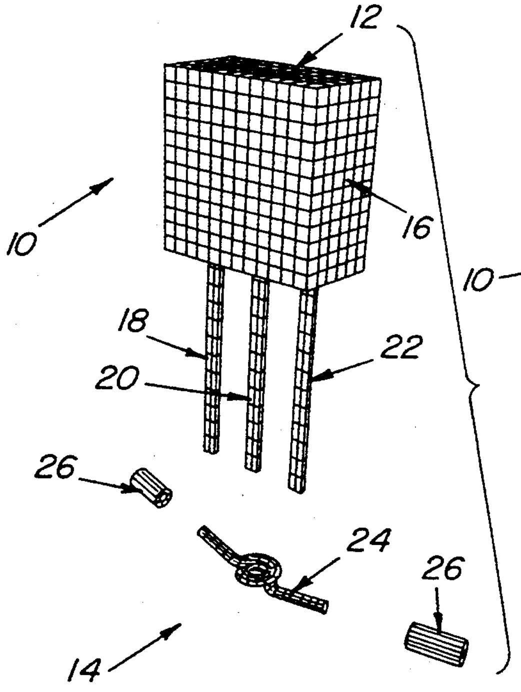
FIG. 1 is an exploded view of the sidactor fail-safe device, constructed in accordance with the principles of the present invention.
Figure 2:
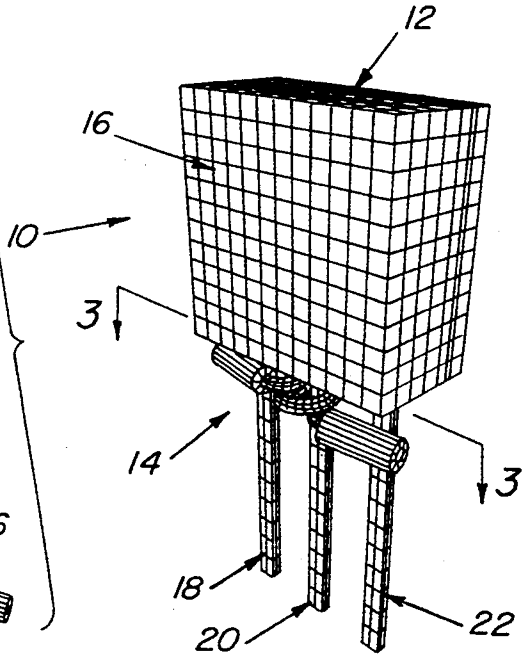
FIG. 2 is a perspective view of the sidactor fail-safe device of FIG. 1, illustrated in the fully assembled condition.

Referring now in detail to the drawings, there is shown in FIGS. 1 and 2 a sidactor fail-safe device designated generally by reference numeral 10 and constructed in accordance with the principles of the present invention. The fail-safe device 10 includes a conventional solid-state voltage suppressor in the form of a sidactor 12 and an improved fail-safe mechanism 14 which is thermally activated by the heat generated by the sidactor at elevated temperatures.

The sidactor 12 has a rectangularly-shaped body member 16 and three legs 18, 20, and 22 which serve as terminal pins for insertion through holes formed in a printed circuit board (not shown). In use, the end terminal pins 18 and 22 of the sidactor 12 are typically connected to two wires of a subscriber line applied between an output tip terminal and an output ring terminal defining a protected side to which telecommunication equipment, that is to be protected against excessive voltage, is joined. The central terminal pin 20 is connected to an earthed ground. Upon the occurrence of a voltage between the end terminal pins 18 and 20 or between either of the end terminal pins 18, 22 and the central terminal pin 20 in excess of a predetermined strike voltage, the sidactor 12 is activated so as to divert or shunt the overvoltage to the ground potential thereby protecting the telecommunication equipment from being damaged or destroyed. This overvoltage condition may be caused by a lightning strike, contact with a high-voltage line, and other similar types of events.

The fail-safe mechanism 14 is comprised of a torsional type spring 24 and a pair of flexible insulators 26. The torsional type spring is preferably made from a wire of spring temper such as a phosphor bronze or beryllium copper and the like which is bent to have a single central coil or looped portion 28 and a pair of generally opposed spring arms 30, 32 extending radially outward from the opposite sides of the central coil portion 28. The wire is preferably a 22-gauge wire which has a diameter of 0.025 inches.

Figure 4:
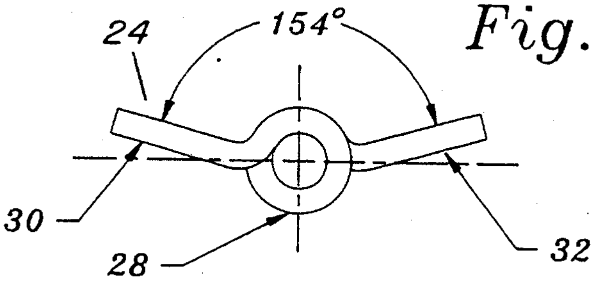
FIG. 4 is an enlarged top plan view of the torsional spring 24.
Figure 5:
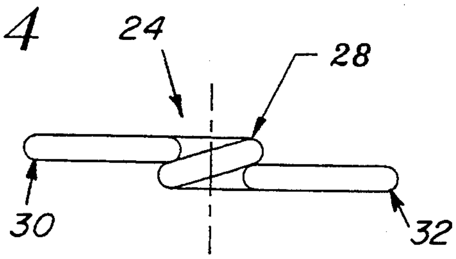
FIG. 5 is a side elevational view of the torsional spring, as seen from the lower portion of FIG. 4.

As can best be seen from FIGS. 4 and 5, the spring arms 30 and 32 of the torsional spring 24 are made or bent so that they do not lie in a straight line forming a 180° angle. In practice, it has been found to be considerably important and critical to the operation of the fail-safe mechanism 14 that the angle formed between the spring arms 30 and 32 prior to assembly be obtuse. In the preferred illustrated embodiment, the obtuse angle is made to be approximately 154° which determines the amount of time that it takes the torsional spring to divert or shunt the overvoltage to ground.

Figure 6:
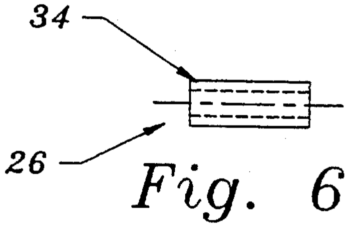
FIG. 6 is an enlarged side elevational view of the insulator 26.
Figure 7:
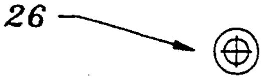
FIG. 7 is an end view of the insulator, as seen from the left or right end of FIG. 6.

The insulators 26 are inserted over the respective ends of the spring arms 30 and 32 of the torsional spring. As shown in FIGS. 6 and 7, each insulator 26 is formed of a relatively short tubular-shaped member 34. The insulator is made from a generally resilient and rubber-like material such as plasticised polyvinyl chloride (PVC) and the like. In the preferred embodiment, the insulator has a length dimension of approximately 0.150 inches and an inner diameter of about 0.027 inches. In this manner, the inner diameters of the insulators permit them to slide over the respective spring arms 30 and 32 and allows them to be rolled as they are pressed onto the end terminal pins 18 and 22 of the sidactor 12 during assembly. Further, the length dimension of the insulators provide the necessary isolation of the terminal pins of the sidactor. The insulators also have operating temperatures in the range of approximately −20° C. to +105° C.

With reference to FIG. 1, in order to assemble the sidactor fail-safe device 10 of the present invention, the insulators 26 are slid onto the ends of the spring arms 30 and 32 of the torsional spring 24 so as to form the fail-safe mechanism 14. Then, the central terminal pin 20 of the sidactor 12 is inserted into the looped portion 28 of the torsional spring 24. As the fail-safe mechanism 14 is moved upwardly along the terminal pins toward the body member 16, the insulators will roll on the end terminal pins 18 and 22 so as to facilitate its location in the fully assembled condition, as shown in FIG. 2. In this fashion, the ends of the spring arms 30 and 32 will come to rest and will engage the surfaces of the end terminal pins of the sidactor through the insulators 26.

Figure 3:
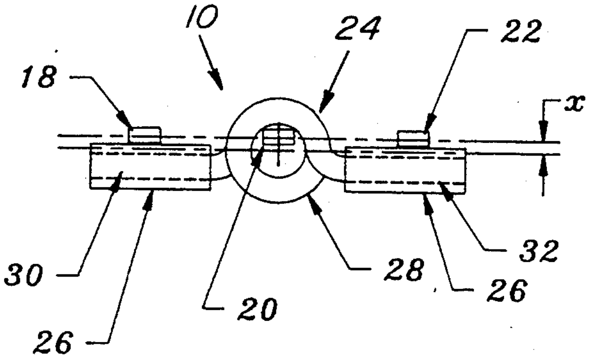
FIG. 3 is a cross-sectional view, taken along the lines 3—3 of FIG. 2.

As depicted in the cross-sectional view of FIG. 3, it is to be noted that the center of the looped portion 28 of the torsional spring 24 surrounding the central terminal pin 20 is off-centered in relationship to the centers of the end terminal pins 18 and 22 after assembly, which is the so-called pre-loaded condition. In other words, the center of the looped portion 28 and the centers of the central terminal pin 20 and the end terminal pins 18 and 22 are not aligned. There is a distance x which exists between the center of the looped portion 28 and the centers of the central terminal pin 20 and the end terminal pins 18 and 22. This off-centered condition serves to insure that sufficient and constant pressure is being applied between each of the spring arms 30, 32 with insulators 26 mounted thereon and the associated end terminal pins 18, 22 of the sidactor 12 so as to cause grounding of the sidactor 12 at the elevated temperatures. This pre-load condition also serves to maintain constant pressure between the looped portion 28 and the central terminal pin 20 of the sidactor 12. As a result, a problem encountered in the prior art of creating enough stress on the conductive member has been eliminated.

In operation, upon the occurrence of a sustained over-voltage/over-current surge condition which results in excessive heat built-up in the sidactor 12, the heat emanating from the sidactor will cause the insulators 26 on the ends of the spring arms 30, 32 to melt sufficiently so as to allow the spring arms to establish good electrical contact with the respective end terminals 18 and 22 thereby providing a continuous short-circuit for dissipating the surge condition to ground. By use of the present invention, it is possible to mount a plurality of the sidactor fail-safe devices 10 onto the printed circuit board for higher packing density without substantially increasing the amount of space needed for the sidactor 12 alone. The fully assembled fail-safe device 10 remains within the length and depth dimension of the sidactor 12 while the height dimension is increased less than 0.090 inches.

From the foregoing detailed description, it can thus be seen that the present invention provides an improved fail-safe mechanism for use with a sidactor for protecting telecommunication equipment against high voltage surges. The fail-safe mechanism of the present invention includes a torsional type spring and a pair of insulators. The torsional spring includes a single looped portion and a pair of spring arms extending radially from the opposite sides of the looped portion. The center of the looped portion is disposed off-centered in relationship to the centers of the end terminal pins of the sidactor for assuring sufficient and constant pressure between the spring arms and the end terminal pins.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A sidactor fail-safe device used for protecting telecommunication equipment against high voltage surges, comprising in combination:

a sidactor having a substantially rectangularly-shaped body member, first and second end terminal pins, and a central terminal pin having a predetermined diametrical extent; and a fail-safe mechanism comprising a torsional type spring defined by means of a single, central looped portion, a pair of spring arms extending radially outwardly from opposite sides of said looped portion, and a pair of insulators;

said single, central looped portion of said torsional type spring having a predetermined diametrical extent which is greater than said diametrical extent of said central terminal pin of said sidactor and being disposed in surrounding relationship with said central terminal pin of said sidactor; said pair of insulators being rotatably disposed upon end portions of said pair of spring arms so as to be rollable upon said first and second end terminal pins of said sidactor when said single, central looped portion of said torsional type spring is mounted upon said central terminal pin of said sidactor; and said spring arms of said torsional type spring being initially formed so as to have an obtuse angle defined therebetween, being movable with respect to each other so as to have an angle therebetween of approximately 180° when said spring arms are mountably engaged upon said first and second end terminal pins, and being resiliently engaged upon said first and second end terminal pins of said sidactor through said pair of insulators so as to generate forces upon said first and second terminal pins which cause the center of said single, central looped portion of said torsional type spring to be disposed off-centered in relationship to the centers of said first and second end terminal pins of said sidactor in order to assure that sufficient and constant pressure is applied between said spring arms and said first and second end terminal pins, whereby upon the occurrence of a substained overload condition, heat emanating from said sidactor will melt said insulators so as to short-circuit said first and/or second end terminal pins to said central terminal pin.

2. A sidactor fail-safe device as claimed in claim 1, wherein said torsional type spring is formed from a wire of spring temper.

3. A sidactor fail-safe device as claimed in claim 1, wherein said torsional type spring is made from phosphor bronze.

4. A sidactor fail-safe device as claimed in claim 1, wherein said torsional spring is formed from a 22-gauge wire having a diameter of 0.025 inches.

5. A sidactor fail-safe device as claimed in claim 1, wherein each of said pair of insulators is made of a resilient rubber-like material.

6. A sidactor fail-safe device as claimed in claim 1, wherein each of said pair of insulators is made of polyvinyl chloride.

7. A sidactor fail-safe device as claimed in claim 1, wherein each of said pair of insulators is formed of a relatively short tubular-shaped member.

8. A sidactor fail-safe device as claimed in claim 7, wherein said tubular-shaped member has an inner diameter of approximately 0.027 inches and a length of about 0.150 inches.

9. A sidactor fail-safe device as claimed in claim 1, wherein the obtuse angle between said spring arms is about 154°.

10. An improved fail-safe mechanism for use with a sidactor for protecting telecommunication equipment, wherein said sidactor includes first and second end terminal pins and a central terminal pin, comprising:

a torsional spring including a single looped portion, a pair of spring arms extending radially outwardly from opposite sides of said looped portion, and a pair of insulators;

said looped portion of said torsional spring being disposed in surrounding relationship with said central terminal pin of said sidactor; said pair of insulators being rotatably disposed upon end portions of said pair of spring arms so as to be rollable upon said first and second end terminal pins of said sidactor when said looped portion of said torsional spring is mounted upon said central terminal pin of said sidactor; said pair of spring arms being initially formed so as to have an obtuse angle defined therebetween, being movable with respect to each other such that the angular separation defined between said spring arms approaches 180° when said spring arms are mountably engaged upon said first and second end terminal pins of said sidactor, and being resiliently engaged upon said first and second end terminal pins of said sidactor through said pair of insulators so that upon the occurrence of a sustained overload condition, heat emanating from said sidactor will melt said pair of insulators so as to short-circuit said first and/or second end terminal pins of said sidactor to said central terminal pin of said sidactor; and the center of said single looped portion of said torsional spring being disposed off-centered in relationship to the centers of said first and second end terminal pins of said sidactor in order to assure that sufficient and constant pressure is applied between said spring arms and said end terminal pins.

11. An improved fail-safe mechanism as claimed in claim 10, wherein said torsional type spring is formed from a wire of spring temper.

12. An improved fail-safe mechanism as claimed in claim 10, wherein said torsional type spring is made from phosphor bronze or beryllium copper.

13. An improved fail-safe mechanism as claimed in claim 10, wherein said torsional spring is formed from a 22-gauge wire having a diameter of 0.025 inches.

14. An improved fail-safe mechanism as claimed in claim 10, wherein each of said pair of insulators is made of a resilient rubber-like material.

15. An improved fail-safe mechanism as claimed in claim 10, wherein each of said pair of insulators is made of polyvinyl chloride.

16. An improved fail-safe mechanism as claimed in claim 10, wherein each of said pair of insulators is formed of a relatively short tubular-shaped member.

17. An improved fail-safe mechanism as claimed in claim 16, wherein said tubular-shaped member has an inner diameter of approximately 0.027 inches and a length of about 0.150 inches.

18. An improved fail-safe mechanism as claimed in claim 10, wherein the obtuse angle between said spring arms is about 154°.

19. A sidactor fail-safe device, including a sidactor having first and second end terminal pins connected to a circuit to be protected and a central terminal pin connected to an earth ground, comprising:

a fail-safe mechanism comprising a torsional type spring defined by means of a single, central looped portion, a pair of spring arms extending radially outwardly from opposite sides of said looped portion, and a pair of insulators;

said looped portion of said torsional spring being disposed in surrounding relationship with said central terminal pin of said sidactor; said pair of insulators being rotatably disposed upon end portions of said pair of spring arms so as to be rollable upon said first and second end terminal pins of said sidactor when said looped portion of said torsional spring is mounted upon said central terminal pin of said sidactor; said pair of spring arms being initially formed so as to have an obtuse angle defined therebetween, being movable with respect to each other such that the angular separation defined between said spring arms approaches 180° when said spring arms are mountably engaged upon said first and second end terminal pins of said sidactor, and being resiliently engaged upon said first and second end terminal pins of said sidactor through said pair of insulators; and the center of said single looped portion of said torsional spring is disposed off-centered in relationship to the centers of said first and second end terminal pins of said sidactor in order to assure that sufficient and constant pressure is generated between said spring arms and said end terminal pins.

20. The device as set forth in claim 19, wherein:

said torsional spring is fabricated from phosphor bronze or beryllium copper wire.

21. The device as set forth in claim 19, wherein:

said pair of insulators comprise tubular-shaped sleeves fabricated from polyvinyl chloride.

22. The device as set forth in claim 19, wherein:

said obtuse angle is approximately 154°.

* * * * *